(12) United States Patent
Kuroda

(10) Patent No.: US 12,055,720 B2
(45) Date of Patent: Aug. 6, 2024

(54) HEAD-MOUNTED DISPLAY AND GLASSES

(71) Applicant: SONY GROUP CORPORATION, Tokyo (JP)

(72) Inventor: Shin Kuroda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 515 days.

(21) Appl. No.: 17/431,806

(22) PCT Filed: Feb. 18, 2020

(86) PCT No.: PCT/JP2020/006239
§ 371 (c)(1),
(2) Date: Aug. 18, 2021

(87) PCT Pub. No.: WO2020/175237
PCT Pub. Date: Sep. 3, 2020

(65) Prior Publication Data
US 2022/0146830 A1    May 12, 2022

(30) Foreign Application Priority Data
Feb. 28, 2019  (JP) .................. 2019-037003

(51) Int. Cl.
G02B 27/01    (2006.01)
G02F 1/153    (2006.01)
H04N 13/344   (2018.01)

(52) U.S. Cl.
CPC ....... *G02B 27/0172* (2013.01); *G02F 1/1533* (2013.01); *H04N 13/344* (2018.05); *G02B 2027/0178* (2013.01); *G02F 2203/48* (2013.01)

(58) Field of Classification Search
CPC ........ G02B 27/0172; G02B 2027/0178; H04N 13/344; G02F 1/1533; G02F 2203/48
USPC .................. 359/275, 630; 345/7–9
See application file for complete search history.

(56) References Cited

U.S. PATENT DOCUMENTS

| | | |
|---|---|---|
| 2010/0110368 A1 | 5/2010 | Chaum |
| 2016/0055822 A1 | 2/2016 | Bell |
| 2018/0136891 A1 | 5/2018 | Yang |
| 2018/0188555 A1 | 7/2018 | Quere |
| 2018/0246327 A1 | 8/2018 | Takagi et al. |

FOREIGN PATENT DOCUMENTS

| | | |
|---|---|---|
| CN | 104865703 A | 8/2015 |
| CN | 106662747 A | 5/2017 |
| CN | 107003517 A | 8/2017 |
| CN | 107430281 A | 12/2017 |

(Continued)

OTHER PUBLICATIONS

International Search Report and Written Opinion of PCT Application No. PCT/JP2020/006239, issued on May 12, 2020, 09 pages of ISRWO.

*Primary Examiner* — William Choi
(74) *Attorney, Agent, or Firm* — CHIP LAW GROUP

(57) ABSTRACT

A head-mounted display includes: an optical member that provides an image; an intermediate member extended with a curvature in a predetermined direction; and a dimming member arranged via a predetermined gap with respect to the optical member and mounted on the intermediate member in such a manner as to have a curvature in the predetermined direction.

16 Claims, 17 Drawing Sheets

(56) References Cited

FOREIGN PATENT DOCUMENTS

| | | |
|---|---|---|
| CN | 107924058 A | 4/2018 |
| CN | 108474952 A | 8/2018 |
| CN | 108508601 A | 9/2018 |
| EP | 3183615 A1 | 6/2017 |
| JP | 2016-126134 A | 7/2016 |
| JP | 2017-103767 A | 6/2017 |
| JP | 2018-141826 A | 9/2018 |
| KR | 10-2017-0044706 A | 4/2017 |
| WO | WO-2014129109 A1 | 8/2014 |
| WO | 2016/028828 A1 | 2/2016 |
| WO | WO-2020170587 A1 * | 8/2020 ......... G02B 27/0172 |

* cited by examiner

HEAD-MOUNTED DISPLAY AND GLASSES

CROSS REFERENCE TO RELATED APPLICATIONS

This application is a U.S. National Phase of International Patent Application No. PCT/JP2020/006239 filed on Feb. 18, 2020, which claims priority benefit of Japanese Patent Application No. JP 2019-037003 filed in the Japan Patent Office on Feb. 28, 2019. Each of the above-referenced applications is hereby incorporated herein by reference in its entirety.

FIELD

The present disclosure relates to a head-mounted display and glasses.

BACKGROUND

Recently, a technology that is called augmented reality (AR) and that presents, to a user, additional information such as an image or character in a superimposed manner on scenery in front of the user attracts attention. A head-mounted display (HMD) that is used by being mounted on a head is known as a device to realize the augmented reality.

In Patent Literature 1, a visual recognition system including an external light transmitting-type head-mounted display that includes a display unit to display information including a character and/or an image and a dimming filter arranged on an outer side of the display unit, and that transmits light from the outside while controlling transmittance of the dimming filter, a discrimination unit that discriminates an object, and a control device that controls the transmittance according to the discrimination by the discrimination unit is disclosed.

CITATION LIST

Patent Literature

Patent Literature 1: JP 2017-103767 A

SUMMARY

Technical Problem

However, the above-described background art may cause a deterioration in performance. Specifically, a dimming member having high rigidity may be used as a dimming member, transmittance of which can be controlled, in a head-mounted display. In a case where a dimming member having high rigidity is provided with a curvature, the dimming member may be deformed from a shape at the time of shipment due to force of returning to an original shape and cause the deterioration in performance.

Note that the above problem may be also generated in what is other than the head-mounted display. For example, in a case where a dimming member having high rigidity is used for glasses, the dimming member may be deformed from a shape at the time of shipment due to force of returning to an original shape and cause the deterioration in performance.

Thus, a head-mounted display and glasses that can control a performance deterioration are proposed in the present disclosure.

Solution to Problem

According to the present disclosure, a head-mounted display includes an optical member that provides an image; an intermediate member extended with a curvature in a predetermined direction; and a dimming member arranged via a predetermined gap with respect to the optical member and mounted on the intermediate member in the predetermined direction.

DESCRIPTION OF EMBODIMENTS

Hereinafter, embodiments of the present disclosure will be described in detail on the basis of the drawings. Note that in the following embodiments, overlapped description is omitted by assignment of the same reference sign to identical parts.

Note that the description will be made in the following order.
<1. Structure of head-mounted display>
<2. Intermediate member and dimming member>
<3. Wiring>
<4. First modification example>
<5. Second modification example>
<6. Third modification example>
<7. Fourth modification example>
<8. Fifth modification example>
<9. Sixth modification example>

1. Structure of Head-Mounted Display

Figure 1:
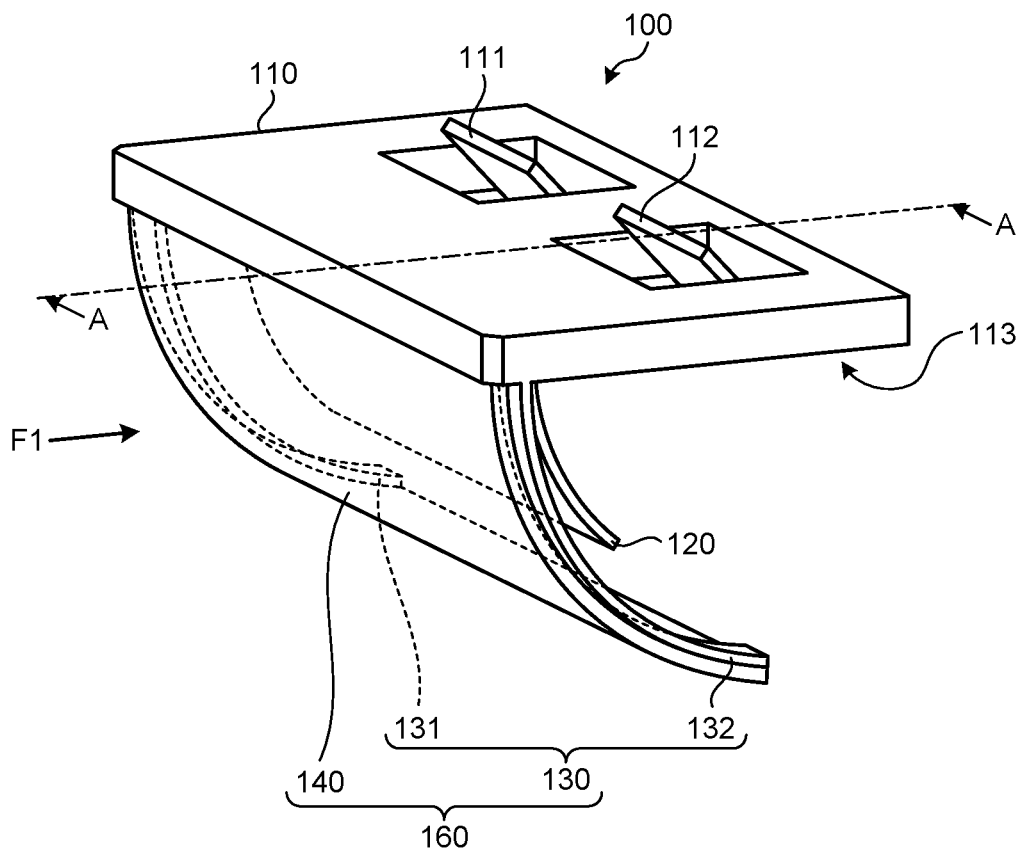
FIG. 1 is a perspective view schematically illustrating a head-mounted display according to an embodiment.
Figure 2:
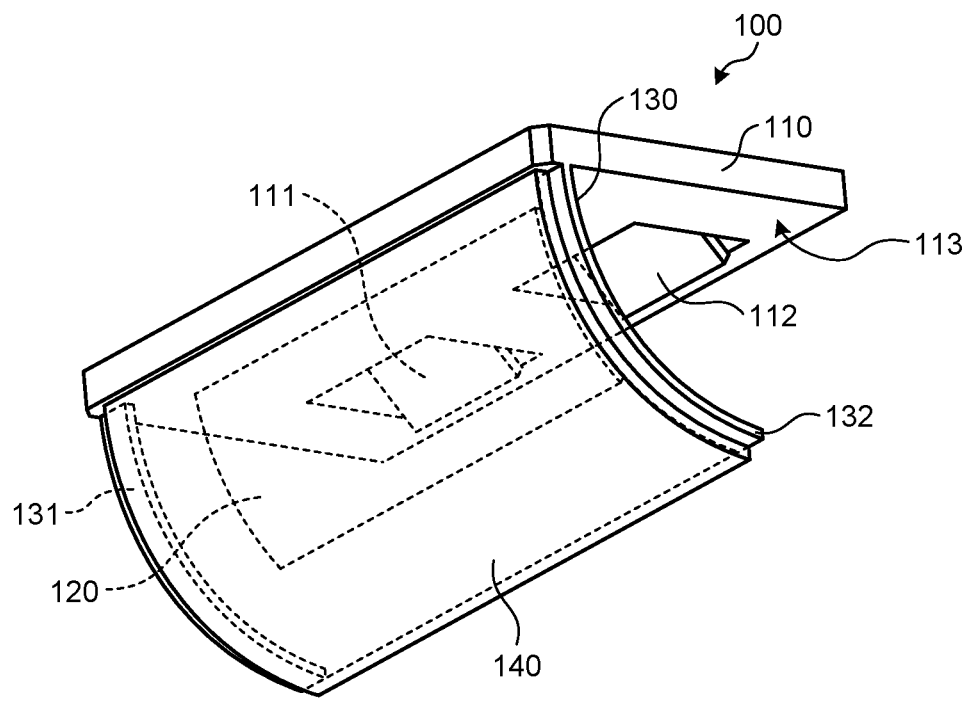
FIG. 2 is a perspective view schematically illustrating the head-mounted display according to the embodiment.
Figure 3:
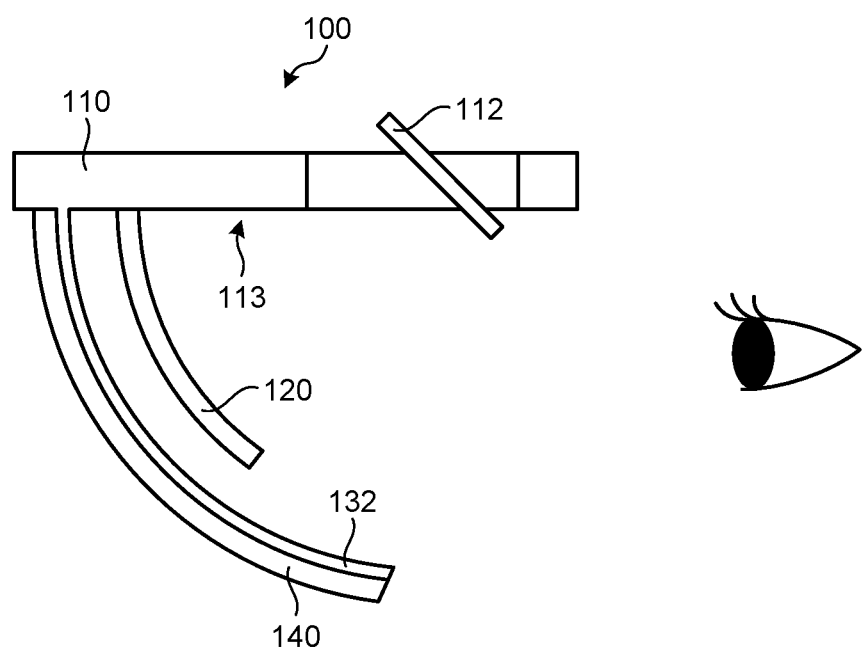
FIG. 3 is a cross-sectional view along a line A-A of FIG. 1.

First, a configuration of a transmissive head-mounted display 100 according to the present disclosure will be described with reference to FIG. 1 to FIG. 3. FIG. 1 and FIG. 2 are perspective views schematically illustrating a head-mounted display 100 according to an embodiment. FIG. 3 is a cross-sectional view along a line AA of FIG. 1.

Figure 7A:
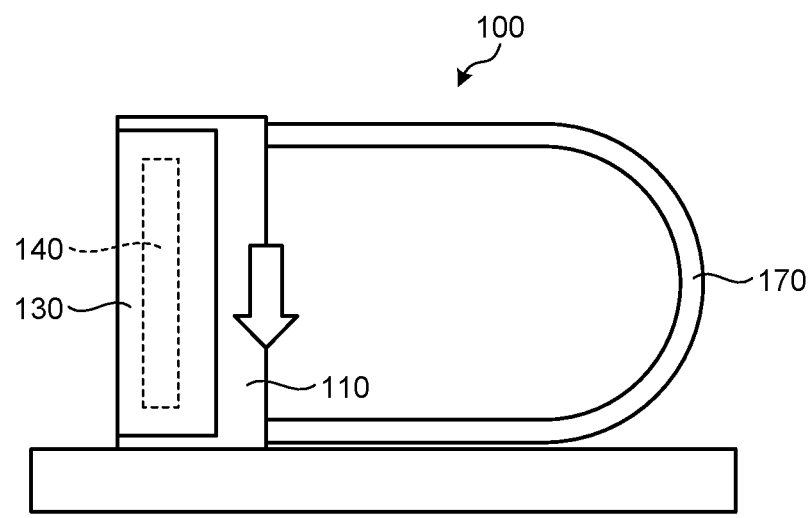
FIG. 7A is a view for describing an intermediate member and a dimming member according to the embodiment.
Figure 7B:
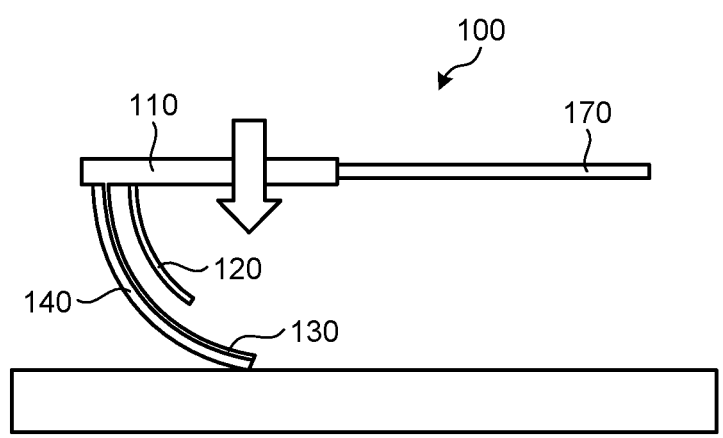
FIG. 7B is a view for describing the intermediate member and the dimming member according to the embodiment.
Figure 7C:
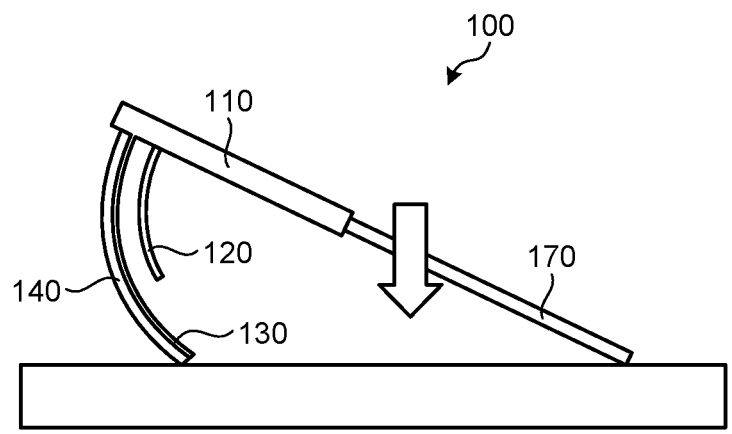
FIG. 7C is a view for describing the intermediate member and the dimming member according to the embodiment.

The head-mounted display 100 according to the present embodiment is used by being mounted on a head of an observer. The head-mounted display 100 provides, in front of the observer, light of various kinds of information (image light) together with external light. The observer can visually recognize a virtual object superimposed and displayed on scenery in a real space. As illustrated in FIG. 1 to FIG. 3, the head-mounted display 100 includes a front block 110, an optical member 120, an intermediate member 130, and a dimming member 140. Note that although the head-mounted display 100 has a mounting portion (such as band) that is a member to fix the head-mounted display 100 to a head of the observer, illustration thereof is omitted in FIG. 1 to FIG. 3. A mounting portion 170 is illustrated in FIG. 7A to FIGS. 7B and 7C (described later).

The front block 110 is a portion mounted on the head of the observer. The front block 110 includes left and right two panel light-emitting units 111 and 112, and a substrate (not illustrated). The substrate performs processing of providing an image to the observer. For example, the substrate includes a control unit that controls an operation of the head-mounted display 100, a memory that stores data, a communication unit with respect to an external device, and the like. The control unit of the substrate includes a central processing unit (CPU), a read only memory (ROM), a random access memory (RAM), and the like. A mounting portion (such as band) to be mounted on the head of the observer may be connected to the front block 110.

The left and right two panel light-emitting units 111 and 112 emit images to present various kinds of images or information to the observer. Specifically, the left and right two panel light-emitting units 111 and 112 respectively emit virtual images for a left eye and a right eye. Here, the presented various kinds of images or information may be information displayed on the basis of data transmitted from a content distribution server or the like, or information stored in a memory mounted on the head-mounted display 100. Also, the presented various kinds of images or information may be information that is data stored in a mobile terminal of a user or data stored in a personal computer (PC), and that is acquired by the head-mounted display 100. Note that the user of the mobile terminal may be the same as the observer or different from the observer.

Also, in the example of FIG. 1 to FIG. 3, the front block 110 has a mounting surface 113. The optical member 120 and the intermediate member 130 are mounted on the mounting surface 113. Note that the mounting surface 113 may be a flat surface or an uneven surface.

The optical member 120 reflects image light emitted from the panel light-emitting units 111 and 112. As a result, the optical member 120 provides the observer with various kinds of images or information. The optical member 120 is made of a material that can reflect light, such as glass and is fixed to the front block 110 by screwing, bonding, or the like. In the example of FIG. 1 to FIG. 3, the optical member 120 is fixed to the mounting surface 113 of the front block 110. In a case where the optical member 120 receives external force from the outside, there is a possibility that display performance of the head-mounted display 100 is deteriorated. Specifically, the display performance may be deteriorated by force applied when the user performs wiping during cleaning or performs gripping or carrying, external force due to drop impact, an influence of own weight, force due to deformation of bonded members, and the like.

The intermediate member 130 is a member to mount the dimming member 140 (described later). The intermediate member 130 is extended with a curvature in a predetermined direction. Note that having a curvature means that the curvature is not 0. The intermediate member 130 has extended portions 131 and 132 extended in a direction of becoming away from the front block 110. The extended portions 131 and 132 are frame members provided apart from each other. Also, with one ends being fixed to the mounting surface 113 of the front block 110, the extended portions 131 and 132 are extended in a direction of becoming away from the mounting surface 113 and in a direction of gradually becoming closer to the optical member 120. Also, the extended portions 131 and 132 are curved in a convex manner in a direction of becoming away from the optical member 120. In other words, each of the extended portions 131 and 132 is curved in an arc shape in such a manner that a center of a curvature is placed on a side of the optical member 120 compared to the intermediate member 130. That is, the predetermined direction is curved in a convex manner in the direction of becoming away from the optical member 120.

Note that in the example of FIG. 1 to FIG. 3, an example in which the intermediate member 130 is integrally molded with the front block 110 is illustrated. However, the intermediate member 130 may be configured as a member separate from the front block 110. The intermediate member 130 may be molded by molding of a synthetic resin. The material included in the intermediate member 130 is not limited to a resin material, and may be a metal material, an alloy, or a combination thereof. The intermediate member 130 may be made of a material having higher rigidity or higher strength than the dimming member 140.

The dimming member 140 is configured by sandwiching of an electrochromic element between transparent electrodes, for example. An oxidation reaction or reduction reaction of the electrochromic element occurs according to voltage applied to the transparent electrodes, and transmittance is controlled. When the head-mounted display 100 is used in the bright outside or the like, there is a case where display brightness is insufficient with respect to external light. In such a case, the dimming member 140 is controlled to control the transmittance, whereby visibility of the head-mounted display 100 can be secured. For example, the dimming member 140 is made of a material that is an acrylic transparent resin to which an antireflection coating or the like is applied, polycarbonate, acrylic, nylon, or the like. A shape of the dimming member 140 before mounting on the intermediate member 130 which shape is illustrated in FIG. 1 and FIG. 2 is rectangular. However, the shape is not necessarily rectangular, and may be polygonal or elliptical, for example.

Incidentally, in order not to deteriorate the display performance of the head-mounted display 100, the dimming member 140 is often arranged on an outer side of the optical member 120. In other words, the outer side is an opposite side of a side to provide an image of the optical member 120, and is a front side of the observer. In other words, it can be said that the dimming member 140 is arranged at a position of sandwiching the optical member 120 with the observer. Also, the outermost component of the head-mounted display 100 may have a curvature. This is to disperse external force when impact is applied to the head-mounted display 100 due to dropping or the like. Thus, there is a case where it is desired to give a curvature to the dimming member 140 that may be arranged on the outer side.

As illustrated in FIG. 3, the dimming member 140 is arranged via a predetermined gap with respect to the optical member 120. Also, the dimming member 140 is attached to the intermediate member 140 in such a manner as to have a curvature in a predetermined direction. Here, having a curvature means that a cross section in a direction intersecting with a direction connecting the extended portions 131 and 132 has an arc shape. In other words, having a curvature means that the cross section in the direction intersecting with the direction connecting the extended portions 131 and 132 is curved. Note that although not being curved in an original shape, the dimming member 140 is held in a curved state by the intermediate member 130 by being attached to the intermediate member 130. Note that both ends of the dimming member 140 are attached to the intermediate member 130, whereby the curved state is strongly held.

The dimming member 140 may be attached with an adhesive, double-sided tape, or the like. Also, the dimming member 140 may be attached in such a manner as to be sandwiched by the intermediate member 130 by being fitted to a groove provided in the intermediate member 130. Specifically, a groove in a predetermined direction may be formed in facing surfaces of the extended portions 131 and 132 that are the intermediate member 130. In this case, the dimming member 140 may be attached to the intermediate member 130 by being slid into the groove.

In FIG. 3, an example in which the dimming member 140 is arranged on the outer side of the intermediate member 130 is illustrated. In FIG. 3, the outer side is a side opposite to a side of the optical member 120, and is a convex side. The dimming member 140 is arranged on an opposite side of a center side of the curvature with respect to the intermediate member 130.

However, the dimming member 140 may be arranged on the center side of the curvature with respect to the intermediate member 130. In other words, the dimming member 140 may be arranged on an inner side of the intermediate member 130. The inner side is a side of the optical member 120, and is an observer side. Also, the dimming member 140 may be attached to an inner surface side of the intermediate member 130. The dimming member 140 tries to be displaced outward by force with which the dimming member 140 tries to return from the curved state. Specifically, an end portion on a side connected to the front block 110 and an end portion on an opposite side in the dimming member 140 try to be displaced in a direction of becoming away from each other and try to return to a flat state. When the dimming member 140 is arranged on the inner side of the intermediate member 130, the intermediate member 130 can absorb the force that tries to displace the both end portions of the dimming member 140 in the direction of becoming away from each other. As a result, the intermediate member 130 can hold the dimming member 140 while keeping the curved state thereof, and can prevent the dimming member 140 from becoming away from the intermediate member 130.

Figure 4A:
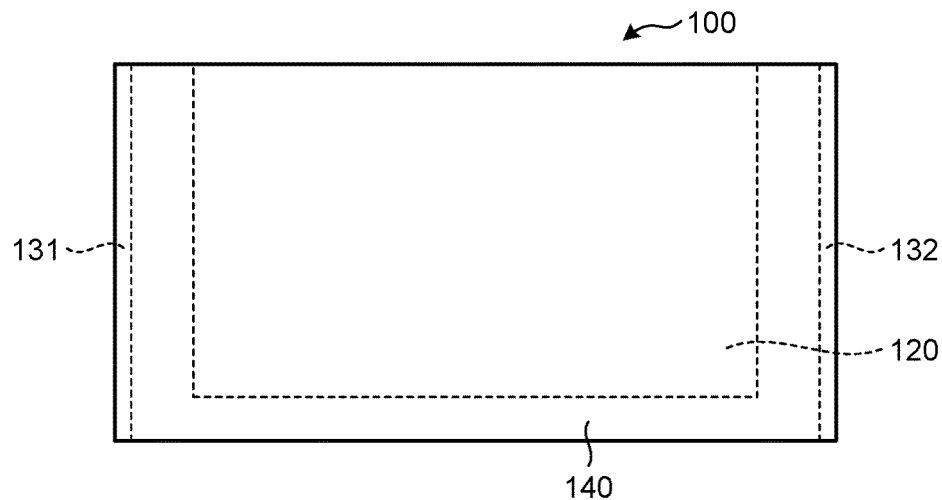
FIG. 4A is a front view seen in a direction F1 of FIG. 1.
Figure 4B:
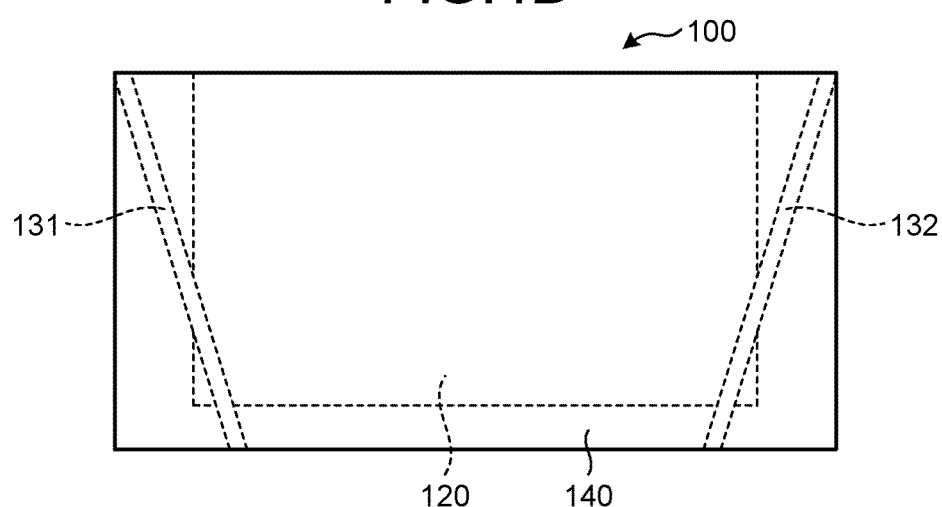
FIG. 4B is a view illustrating another example of an intermediate member according to the embodiment.

As illustrated in FIG. 1 and FIG. 2, the extended portions 131 and 132 are extended along an outer periphery of the dimming member 140 in a direction of becoming away from the front block 110. The extended portions 131 and 132 are arranged along the outer periphery in such a manner as not to obstruct a field of view of the observer as much as possible. However, each of the extended portions 131 and 132 only needs to be extended with a curvature, and does not have to be along the outer periphery of the dimming member 140. Also, in the example of FIG. 1 to FIG. 3, the extended portions 131 and 132 are extended in parallel in the same direction. However, this is merely an example. This point will be described with reference to FIGS. 4A, 4B, 4C, 4D, and, 4E. FIG. 4A is a front view seen in the direction F1 of FIG. 1. FIGS. 4B, 4C, 4D, and 4E are views illustrating another example of the intermediate member 130 according to the embodiment. Note that FIGS. 4B, 4C, 4D, and 4E, front views seen in the direction F1 similarly to FIG. 4A are illustrated.

Figure 4C:
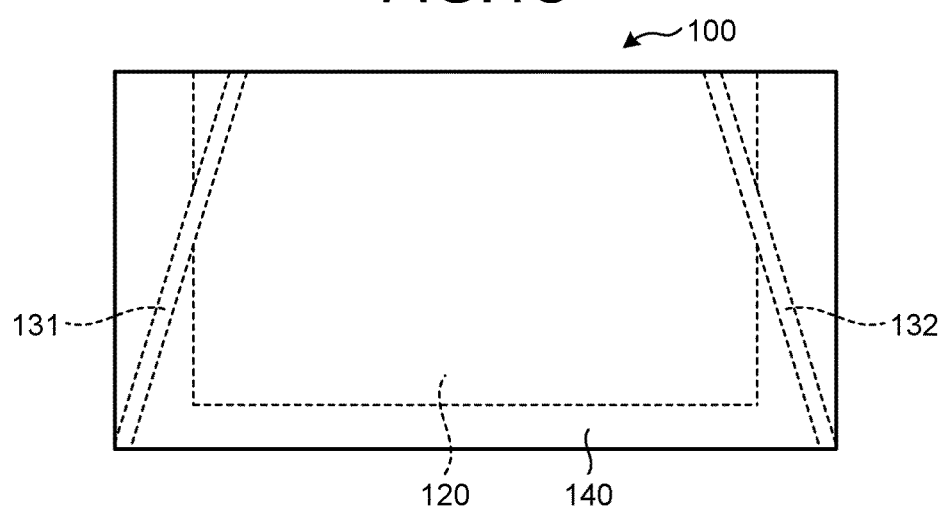
FIG. 4C is a view illustrating another example of the intermediate member according to the embodiment.
Figure 4D:
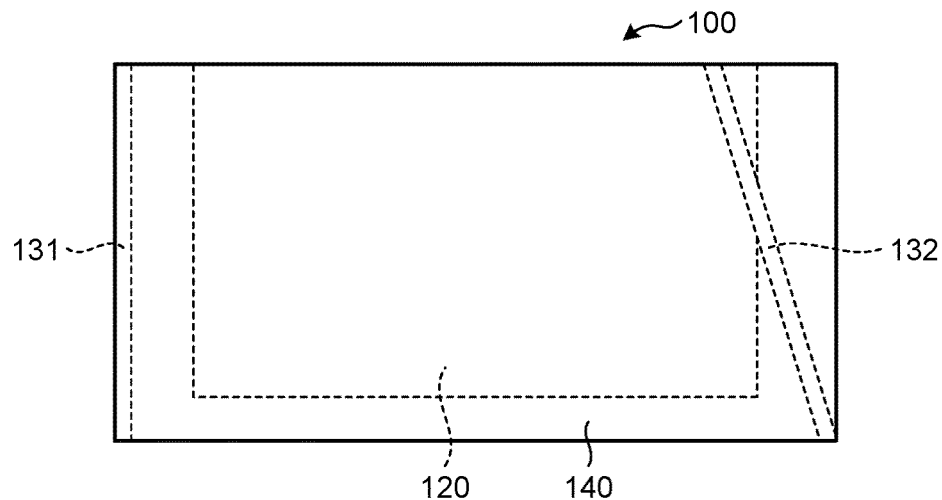
FIG. 4D is a view illustrating another example of the intermediate member according to the embodiment.
Figure 4E:
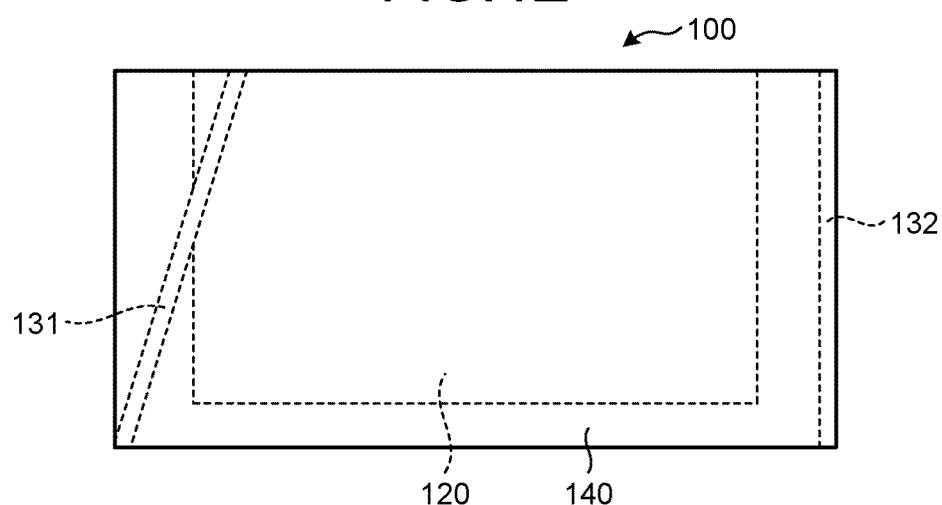
FIG. 4E is a view illustrating another example of the intermediate member according to the embodiment.

In the example of FIG. 4A, the extended portions 131 and 132 are extended in parallel in the same direction similarly to the example illustrated in FIG. 1 to FIG. 3. However, the extended portions 131 and 132 may be extended from the front block 110 in a direction of becoming closer to each other as in the example illustrated in FIG. 4B, or may be extended in a direction of becoming away from each other as illustrated in FIG. 4C. Also, one of the extended portions 131 and 132 may be extended in a direction of becoming closer as illustrated in FIG. 4D, or may be extended in a direction of becoming away as illustrated in FIG. 4E. That is, predetermined directions respectively corresponding to the extended portions 131 and 132 may be different from each other.

Figure 4F:
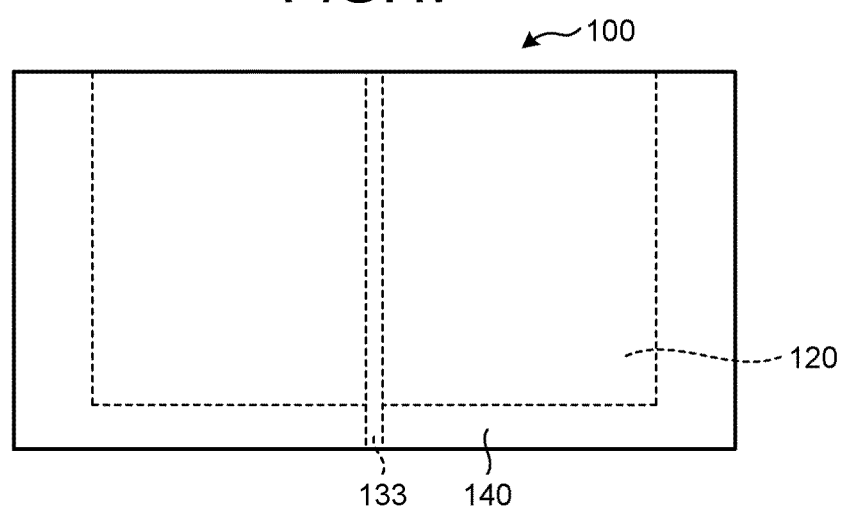
FIG. 4F is a view illustrating another example of the intermediate member according to the embodiment.

Also, in the example of FIG. 1 to FIG. 3, an example in which the intermediate member 130 has the two extended portions 131 and 132 is illustrated. However, this is merely an example. This point will be described with reference to FIG. 4F. FIG. 4F is a view illustrating another example of the intermediate member 130 according to the embodiment. For example, as illustrated in FIG. 4F, an intermediate member 130 may have one extended portion 133 instead of the extended portions 131 and 132. In the example illustrated in FIG. 4F, the extended portion 133 is extended not along an outer periphery of a dimming member 140 but along a central portion of the dimming member 140.

Figure 5A:
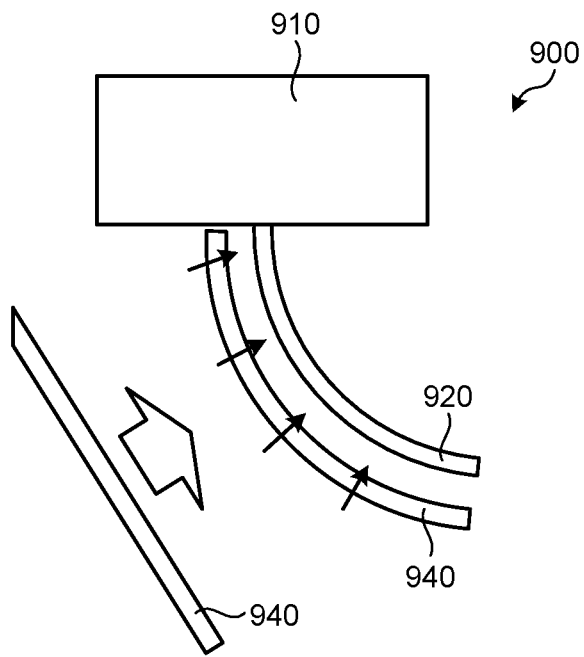
FIG. 5A is a cross-sectional view for describing a head-mounted display according to a comparative example.
Figure 5B:
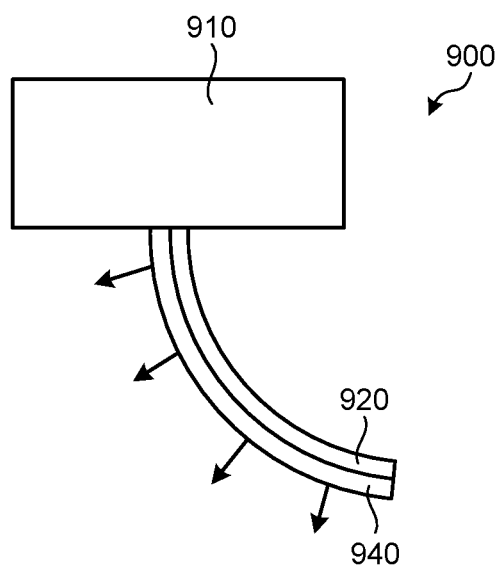
FIG. 5B is a cross-sectional view for describing a head-mounted display according to a comparative example.

Next, an example of an effect acquired when the dimming member 140 is arranged via a predetermined gap with respect to the optical member 120 and mounted on the intermediate member 130 will be described with reference to FIG. 5A and FIG. 5B. FIGS. 5A and 5B are cross-sectional views for describing a head-mounted display 900 according to a comparative example. In FIG. 5A, a state before a dimming member 940 according to the comparative example is attached to an optical member 920 is illustrated. In FIG. 5B, a state after the dimming member 940 according to the comparative example is attached to the optical member 920 is illustrated.

Generally, it is difficult to manufacture a dimming member having a certain degree of rigidity and in a curved state. As illustrated in FIGS. 5A and 5B, in a case where the dimming member 940 is arranged in a state of having a curvature, it is conceivable to attach the dimming member 940 to the optical member 920. However, in a case where the dimming member 940 is attached to the optical member 920, repulsive force caused by the dimming member 940 trying to return from the curved state to an original state is applied to the optical member 920 in a direction indicated by arrows in FIG. 5B. As a result, the optical member 920 may be deformed or displaced, and there is a possibility that display performance of the head-mounted display 900 is deteriorated. The dimming member 140 according to the present embodiment is arranged via a predetermined gap with respect to the optical member 120, and is attached to the intermediate member 130 having higher rigidity than the dimming member 140. As a result, according to the head-mounted display 100 of the present embodiment, repulsive force from the dimming member 140 can be prevented from being applied to the optical member 120.

Figure 6:
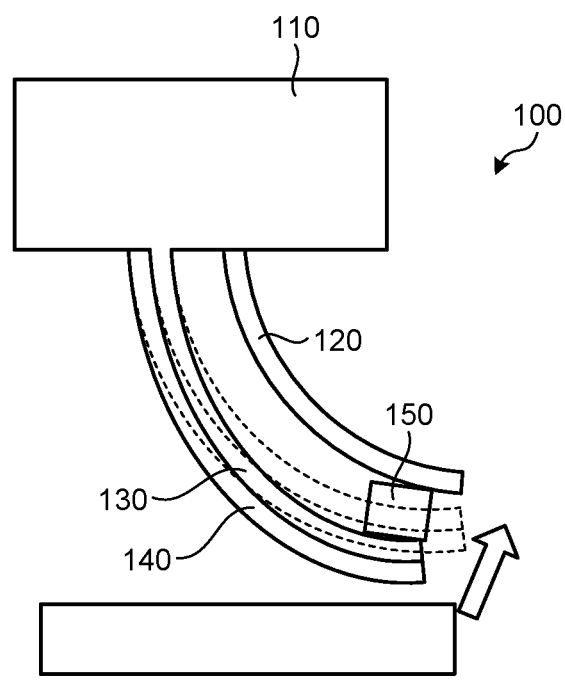
FIG. 6 is a view for describing an example of an effect of the head-mounted display according to the embodiment.

Next, an example of another effect by an arrangement of the dimming member 140 via a predetermined gap with respect to the optical member 120 will be described with reference to FIG. 6. FIG. 6 is a view for describing an example of an effect of the head-mounted display 100 according to the embodiment.

As illustrated in FIG. 6, there is a possibility that the dimming member 140 placed on the outer side and attached to the intermediate member 130 is greatly displaced in a direction of an arrow illustrated in the drawing in a case where external force is applied from the outside to the head-mounted display 100 due to drop impact or the like. For example, in a case where the dimming member 940 is attached to the optical member 920 as in the head-mounted display 900 according to the comparative example illustrated in FIGS. 5A and 5B, external force applied to the dimming member 940 arranged on an outer side is directly applied to the optical member 920. Thus, the optical member 920 is deformed or displaced. On the one hand, in the head-mounted display 100 according to the present embodiment, a predetermined gap is provided between the dimming member 140 attached to the intermediate member 130 and the optical member 120. Thus, stress due to displacement of the dimming member 140 attached to the intermediate member 130 can be made less likely to be transmitted to the optical member 120. That is, it is possible to make it less likely for the optical member 120 to be influenced by the displacement of the dimming member 140. For example, it is possible to prevent interference between the dimming member 140 attached to the intermediate member 130, and the optical member 120. As a result, it is possible to prevent deformation or displacement of the optical member 120 and prevent a deterioration in the display performance of the head-mounted display 100.

Also, for example, in a case where the dimming member 940 attached to an intermediate member 930 is attached to the optical member 920 as in the head-mounted display 900 according to the comparative example illustrated in FIGS. 5A and 5B, there is a possibility that deformation or displacement of the optical member 920 may be caused due to dimensional variation in the intermediate member 930. On the one hand, in the head-mounted display 100 according to the present embodiment, a predetermined gap a predetermined gap is provided between the dimming member 140 attached to the intermediate member 130, and the optical member 120. Thus, it is possible to reduce an influence of dimensional variation in the intermediate member 130.

Note that the head-mounted display 100 may have a member that absorbs external force applied to the dimming member 140. This point will be described with reference to FIG. 6. The head-mounted display 100 illustrated in FIG. 6 has a spacer 150. The spacer 150 is a member to secure a space. The spacer 150 may be anything as long as being an elastic/stretch member. In a case where a predetermined gap between the dimming member 140 attached to the intermediate member 130, and the optical member 120 is small, the spacer 150 may be installed in the predetermined gap to make the dimming member 140 attached to the intermediate member 130 and the optical member 120 slightly come into contact with each other. Here, slight contact means abutment without fixation.

Note that the spacer 150 may be arranged on the other end side of the extended portions 131 and 132 one ends of which are connected to the front block 110. When external force due to drop impact or the like is applied to the head-mounted display 100, there is a possibility that the other end side of the extended portions 131 and 132 which side is not fixed to the front block 110 is displaced more than the one end side thereof and collides (interferes) with the optical member 120. When the spacer 150 is arranged on the other end side, it is possible to reduce the interference.

2. Intermediate Member and Dimming Member

Figure 7D:
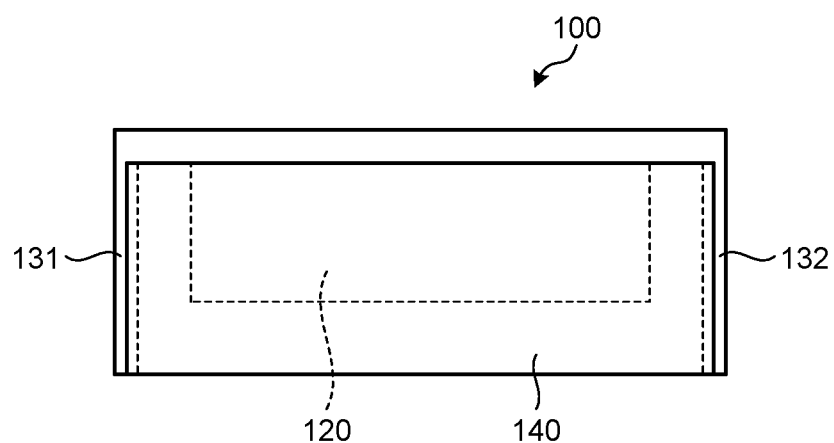
FIG. 7D is a view for describing the intermediate member and the dimming member according to the embodiment.

Next, sizes, shapes, and strength suitable for the intermediate member 130 and the dimming member 140 will be described with reference to FIGS. 7A, 7B, 7C, and 7D. FIGS. 7A, 7B, 7C, and 7D are views for describing the intermediate member 130 and the dimming member 140 according to the embodiment. FIGS. 7A, 7B, and 7C are examples of possible postures of the head-mounted display 100. FIG. 7A is a top view, FIGS. 7B and 7C are side views, and FIG. 7D is a front view. The head-mounted display 100 illustrated in FIGS. 7A, 7B, 7C, and 7D have a mounting portion 170 to fix the head-mounted display 100 to a head of an observer.

It is desirable that the head-mounted display 100 is configured in such a manner that a load is not applied to the optical member 120 in a case of being placed on a floor, a desk, or the like. In a case where a user places the head-mounted display 100 on the floor or desk, the head-mounted display 100 can take various postures. In a case of being placed on the floor or desk, weight of the head-mounted display 100 itself (weight of the head-mounted display 100) is applied in a direction of arrows illustrated in FIGS. 7A, 7B, and 7C.

It is preferable that a size of a dimming unit 160 that is the intermediate member 130 and the dimming member 140 of the head-mounted display 100 is configured to be larger than a size of the optical member 120. In other words, as illustrated in FIG. 7D, it is preferable that the entire optical member 120 is covered with the dimming member 140 in front view. That is, it is desirable that the optical member 120 does not come into contact with the floor, desk, or the like even in a case where the head-mounted display 100 is placed in any posture.

In FIG. 7A, a side surface of the head-mounted display 100 comes into contact with the floor or desk. In this case, it is desirable that the optical member 120 does not come into contact with the floor or desk. For example, a lateral size of the dimming unit 160 that is the intermediate member 130 and the dimming member 140 of the head-mounted display 100 is configured to be larger than a lateral size of the optical member 120. In the following, it is assumed that a lateral direction of the dimming member 140 indicates a lateral direction in FIG. 7D, and a longitudinal direction of the dimming member 140 indicates a longitudinal direction in FIG. 7D. Note that the lateral direction is a horizontal direction of when the head-mounted display 100 is mounted. In other words, the lateral direction is a direction along a surface of the front block 110. Also, the longitudinal direction is a vertical direction of when the head-mounted display 100 is mounted. In other words, the longitudinal direction is a direction of becoming away from the front block 110 and being along the dimming member 140 in the front view.

In FIG. 7B, the head-mounted display 100 is placed in a horizontal state on the floor or desk. Here, a lower portion of the dimming unit 160 that is the intermediate member 130 and the dimming member 140 is in contact with the floor or desk. Note that the lower portion of the dimming unit 160 is an end portion, which is on an opposite side of one end side arranged on a side of the front block 110, of the dimming unit 160. Alternatively, the lower portion of the dimming unit 160 is a region, which is on a lower side when the head-mounted display 100 is mounted, of the dimming unit 160. In order to prevent a contact of the optical member 120, for example, a longitudinal size of the dimming unit 160 that is the intermediate member 130 and the dimming member 140 of the head-mounted display 100 is configured to be larger than a longitudinal size of the optical member 120. Also, the intermediate member 130 and the dimming member 140 need to have strength with which the optical member 120 is not influenced even when the weight of the head-mounted display 100 itself is applied and the intermediate member 130 and the dimming member 140 are deformed.

In FIG. 7C, the mounting portion 170 of the head-mounted display 100 and the lower portion of the dimming unit 160 that is the intermediate member 130 and the dimming member 140 are in contact with the floor or desk. In order to prevent the optical member 120 from being included in a contact area, for example, the longitudinal size of the dimming unit 160 that is the intermediate member 130 and the dimming member 140 of the head-mounted display 100 is configured to be larger than the longitudinal size of the optical member 120. Also, the intermediate member 130 and the dimming member 140 need to have strength with which the optical member 120 is not influenced even when the weight of the head-mounted display 100 itself is applied to the contact area and the intermediate member 130 and the dimming member 140 are deformed.

In such a manner, it is desirable to design the sizes, shapes, and strength of the intermediate member 130 and the dimming member 140 in consideration of the shape or placed postures of the head-mounted display 100.

As illustrated in FIG. 7D, it is desirable that the optical member 120, the intermediate member 130, and the dimming member 140 are designed in such a manner that external force is not applied to the optical member 120 regardless of a direction in which the external force is applied to the head-mounted display 100. For example, when the size of the dimming unit 160 that is the intermediate member 130 and the dimming member 140 of the head-mounted display 100 is configured to be larger than the size of the optical member 120, it is possible to protect the optical member 120 and to prevent deterioration in the display performance.

3. Wiring

Figure 8:
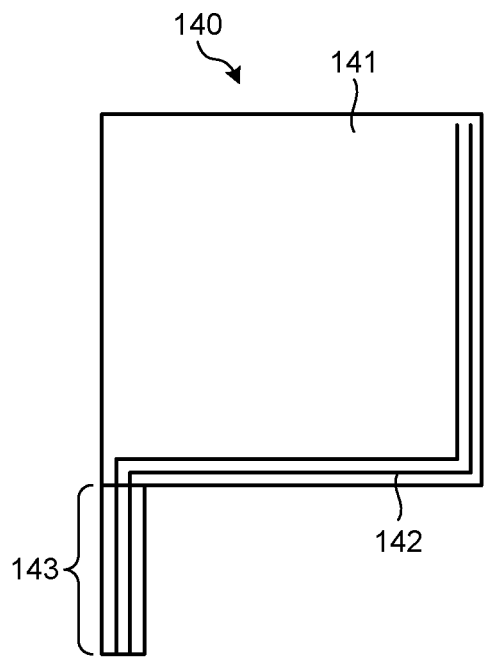
FIG. 8 is a front view schematically illustrating a configuration of the dimming member according to the embodiment.
Figure 9:
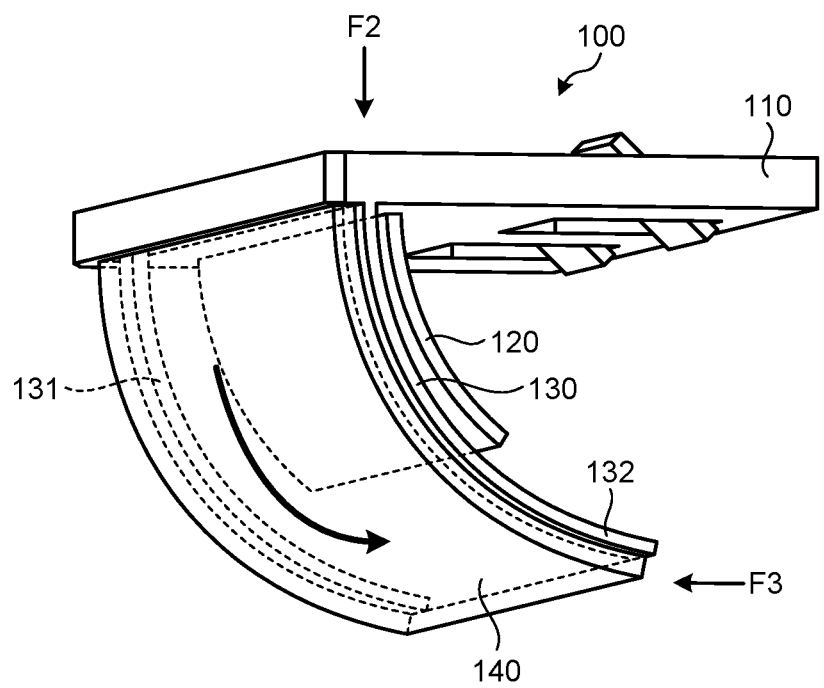
FIG. 9 is a perspective view schematically illustrating the head-mounted display according to the embodiment.

Next, a wiring position of the dimming member 140 will be described with reference to FIG. 8 and FIG. 9. FIG. 8 is a front view schematically illustrating a configuration of the dimming member 140 according to the embodiment. FIG. 9 is a perspective view schematically illustrating the head-mounted display 100 according to the embodiment.

As illustrated in FIG. 8, the dimming member 140 includes a dimming element 141, a wiring line 142, and a terminal portion 143. The dimming element 141 is a region in which transmittance is controlled. The wiring line 142 includes a transparent electrode, and a voltage is applied thereto. In FIG. 8, the wiring line 142 is arranged along the outer periphery of the dimming member 140. At an end portion of the wiring line 142, there is the terminal portion 143 to which voltage is applied. The wiring line 142 is pulled out from the terminal portion 143. Current flows through a wiring portion 142 in response to the voltage applied to the terminal portion 143, and the transmittance of the dimming element 141 is controlled. The terminal portion 143 is made of copper foil or the like, and may be peeled off when being strongly bent.

The terminal portion 143 is arranged at an end portion, which has a flat shape in planar view, in the dimming member 140. Here, a line-of-sight direction in the planar view is a vertical direction of an end surface of the dimming member 140. For example, when the dimming member 140 is seen in directions F2 and F3, a shape thereof in the planar view is flat in FIG. 9. At the end portion having the flat shape in the planar view in the dimming member 140, the terminal portion 143 is arranged in a part of an end surface that is on a side of facing the front block 110 including the substrate (side corresponding to the direction F2) and that is indicated by a dotted line. Since the terminal portion 143 is arranged at the end portion having the flat shape in the planar view in the dimming member 140, it is possible to prevent the terminal portion 143 from being bent and the copper foil from being peeled off, for example. Note that the terminal portion 143 can be also arranged at an end portion on a side far from the front block 110 (side corresponding to the direction F3). In that case, by arranging the wiring line 142 along the extended portions 131 and 132, it is possible to secure a larger field of view for the observer. Note that it is possible to hide the wiring line from the outside by performing wiring along a frame from the position where the terminal portion 143 is arranged to the front block 110 including the substrate.

4. First Modification Example

Figure 10:
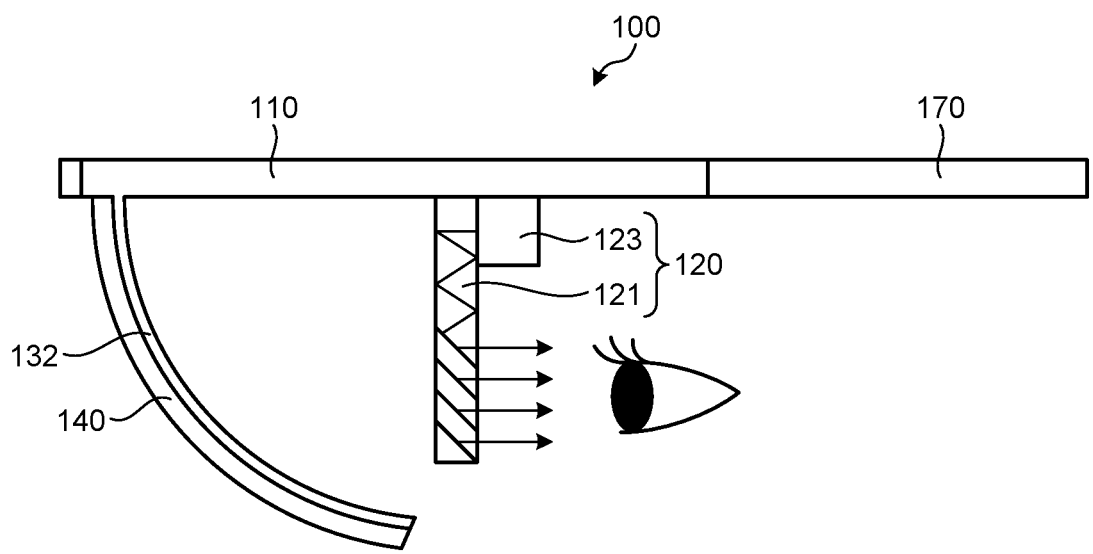
FIG. 10 is a cross-sectional view of a head-mounted display according to a first modification example.
Figure 11:
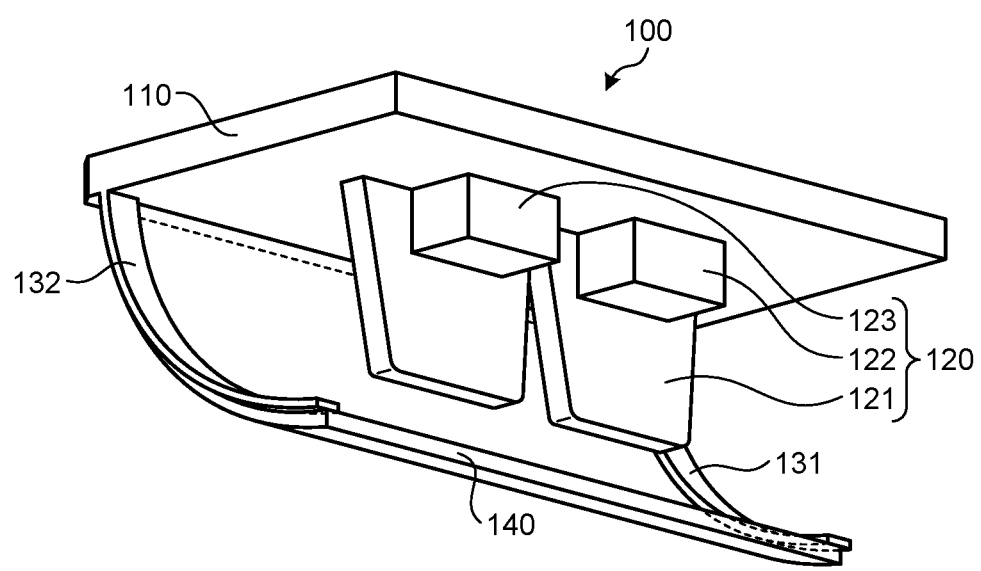
FIG. 11 is a perspective view schematically illustrating the head-mounted display according to the first modification example.

The first modification example will be described with reference to FIG. 10 and FIG. 11. FIG. 10 is a cross-sectional view of a head-mounted display 100 according to the first modification example, and FIG. 11 is a perspective view schematically illustrating the head-mounted display 100 according to the first modification example. The head-mounted display 100 according to the first modification example is different in a point that an optical member 120 includes a light guide plate 121 and light sources 122 and 123. Other configurations are the same as those in the embodiment described above.

The light guide plate 121 includes a transparent member. For example, the light guide plate 121 is a hologram light guide plate, a dielectric multilayer film light guide plate, or the like. In the head-mounted display 100 according to the first modification example, light incident from the light sources 122 and 123 is reflected and propagated by the light guide plate, and is guided to eyes of an observer. The light guide plate 121 and the light sources 122 and 123 are fixed to a mounting surface 113 of a front block 110.

5. Second Modification Example

Figure 12:
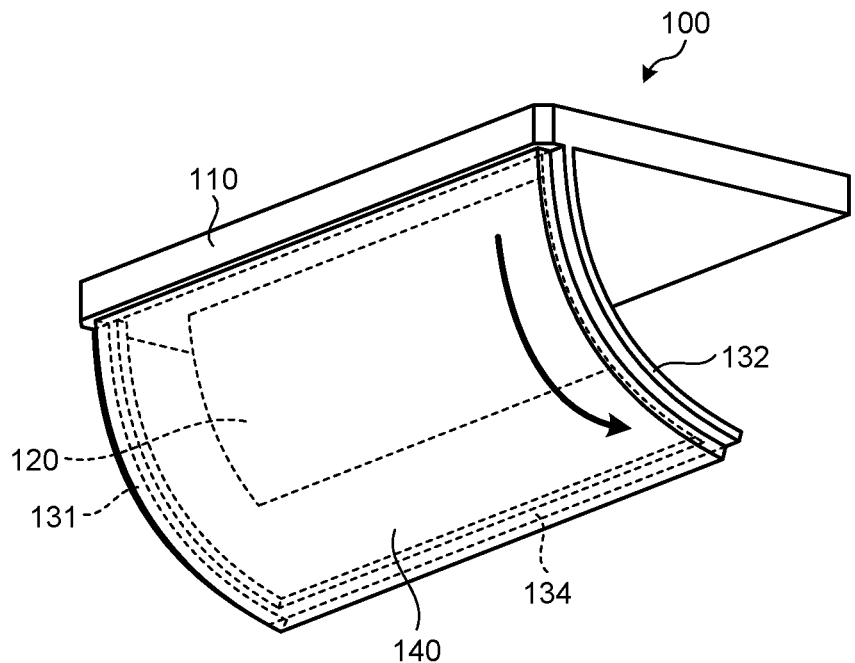
FIG. 12 is a perspective view schematically illustrating a head-mounted display according to a second modification example.

The second modification example will be described with reference to FIG. 12. FIG. 12 is a perspective view schematically illustrating a head-mounted display 100 according to the second modification example. In the head-mounted display 100 according to the second modification example, extended portions 131 and 132 are arranged along a dimming member 140 with one ends thereof being connected to a front block 110, similarly to the embodiment described above. However, a point that a reinforcement portion 134 is arranged along an outer periphery of a dimming member 130 in such a manner as to connect the other ends of the extended portions 131 and 132 is different. Note that the reinforcement portion 134 does not have a curvature. Other configurations are the same as those in the embodiment described above. The extended portions 131 and 132 and the reinforcement portion 134 may be molded integrally or may be separated. In such a manner, it is possible to increase strength by arranging the reinforcement portion 134.

Note that in the second modification example, an optical member 120 may include a light guide plate 121 and light sources 122 and 123 similarly to the first modification example.

6. Third Modification Example

Figure 13:
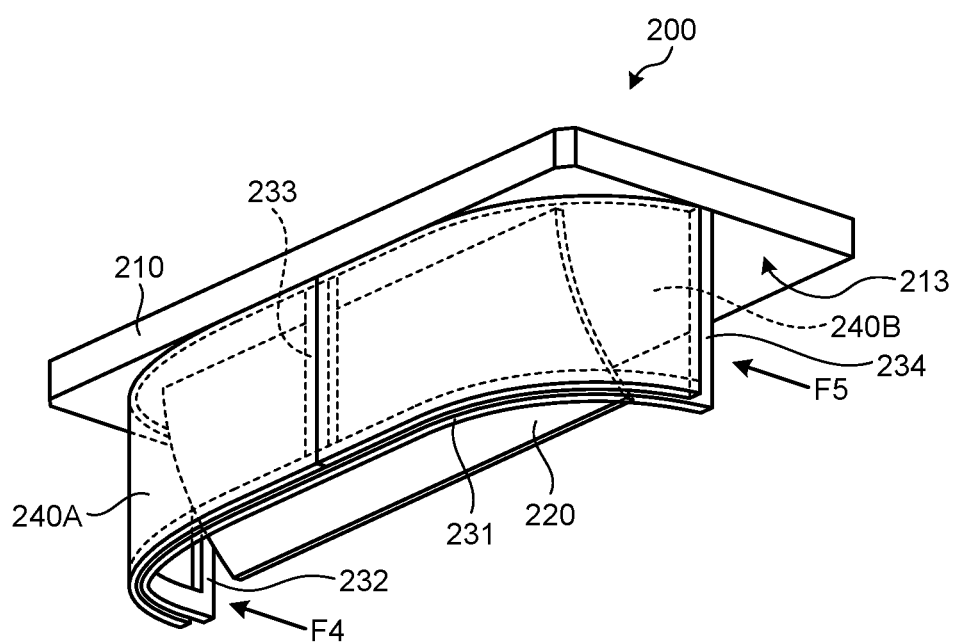
FIG. 13 is a perspective view schematically illustrating a head-mounted display according to a third modification example.
Figure 14:
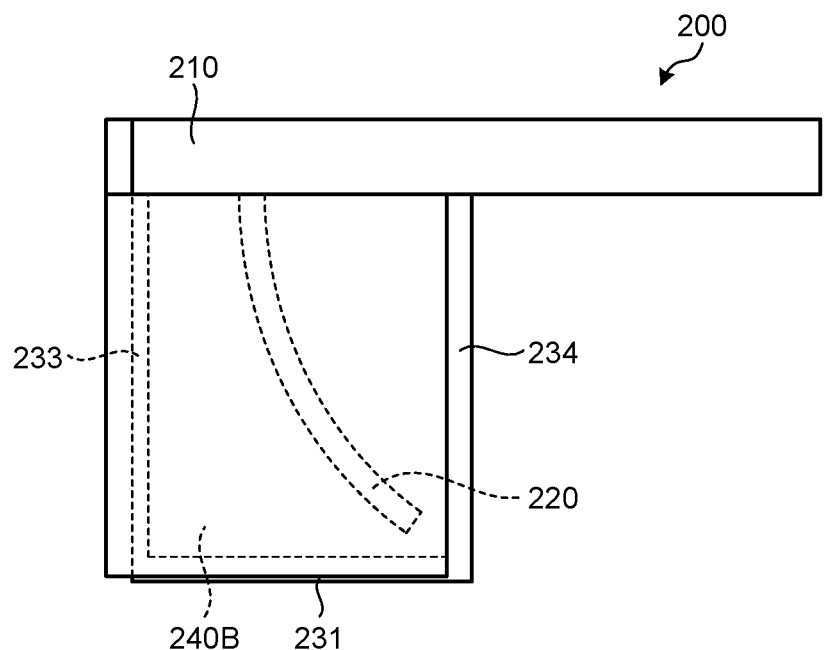
FIG. 14 is a side view schematically illustrating the head-mounted display according to the third modification example.

The third modification example will be described with reference to FIG. 13 and FIG. 14. FIG. 13 is a perspective view schematically illustrating a head-mounted display 200 according to the third modification example. FIG. 14 is a side view schematically illustrating the head-mounted display 200 according to the third modification example.

In the head-mounted display 200 according to the third modification example, two dimming members 240 (240A and 240B) are arranged. An intermediate member 230 has an extended portion 231, and reinforcement portions 232, 233, and 234. The reinforcement portions 232, 233, and 234 are extended in a direction of becoming away from a front block 210. Specifically, one ends of the reinforcement portions 232, 233, and 234 are mounted on a mounting surface 213 of the front block 210, and the reinforcement portions 232, 233, and 234 are extended in a direction of becoming away from the mounting surface 213. The extended portion 231 connects the other ends of the reinforcement portions 232, 232, and 234, and is arranged along an outer periphery of the dimming members. Furthermore, the extended portion 231 is extended with a curvature in a predetermined direction. Here, the predetermined direction is a direction that intersects with the direction of becoming away from the front block 210. Specifically, the predetermined direction is a direction that intersects with a longitudinal direction of the head-mounted display 200. In other words, the predetermined direction is a direction along the mounting surface 213 of the front block 210. The extended portion 231 may include a portion having no curvature. For example, as illustrated in FIG. 13, a curvature may not be included at a center of the extended portion 231, may be included as a distance from the center becomes longer, and may not be included at end portions.

Each of the dimming members 240A and 240B is mounted on the intermediate member 230 in such a manner as to have a curvature in the predetermined direction. The dimming members 240A and 240B are arranged via a predetermined gap with respect to an optical member 220. Note that in the third modification example, the dimming members 240A and 240B do not have a curvature in the direction becoming away from the front block 210.

Not all of the reinforcement portions 232, 233, and 234 extended in the direction of becoming away from the front block 210 need to be arranged. For example, either the reinforcement portion 233 extended from a center of the front block 210 or the reinforcement portions 232 and 234 respectively extended from both end sides of the front block 210 may not be arranged.

In the third modification example, terminal portions 243A and 243B of the dimming members 240A and 240B are arranged at end portions having a flat shape in planar view. For example, since shapes in the planar view are flat when seen in directions F4 and F5 in FIG. 13, the terminal portions 243A and 243B are arranged at left and right ends of the dimming members 240 when seen from the front, that is, at positions corresponding to parts of the reinforcement portions 232 and 233. In other words, the terminal portion 243A of the dimming member 240A is arranged at an end portion where the dimming member 240A is mounted on the reinforcement portion 232. Also, the terminal portion 243B of the dimming member 240B is arranged at an end portion where the dimming member 240B is mounted on the reinforcement portion 233. This makes it possible to prevent the terminal portions 243A and 243B from being bent and copper foil from being peeled off, for example. Note that it is possible to hide a wiring line from the outside by performing wiring along a frame from the positions where the terminal portions 243A and 243B are arranged to the front block 210 including a substrate.

Figure 15:
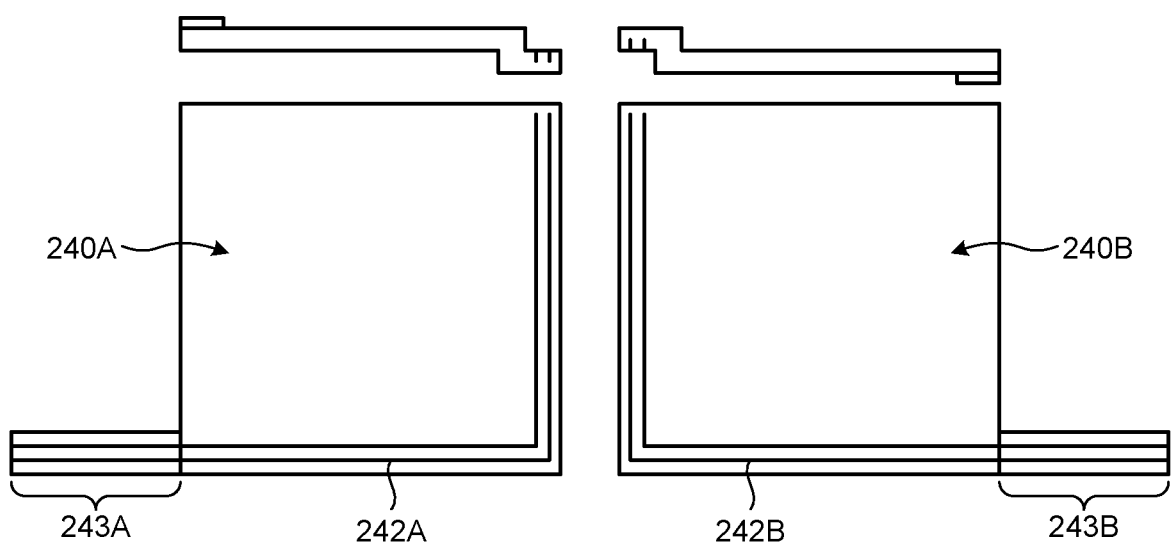
FIG. 15 is a front view illustrating a dimming member according to the third modification example.
Figure 16:
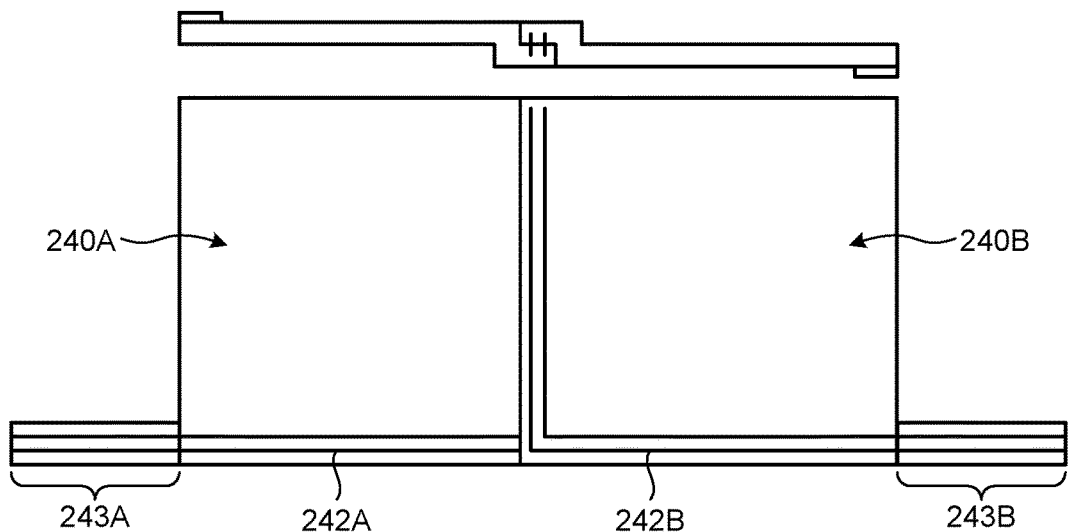
FIG. 16 is a front view illustrating the dimming member according to the third modification example.

FIG. 15 and FIG. 16 are front view views illustrating the dimming members 240A and 240B according to the third modification example. An example in which the dimming members 240A and 240B are arranged side by side is illustrated in FIG. 15, and an example in which the dimming members 240A and 240B are arranged in an overlapped manner is illustrated in FIG. 16. In a case where the dimming members 240A and 240B are arranged side by side in a manner illustrated in FIG. 15, there is a possibility that a field of view of an observer is limited for area of a part where wiring lines 242A and 242B are combined. When the wiring lines 242A and 242B of the dimming members 240A and 240B are arranged in such a manner that parts thereof are overlapped with each other in a manner illustrated in FIG. 16, it becomes possible to secure a large field of view for the observer compared to the case of FIG. 15. In FIG. 16, the two dimming members 240A and 240B may have the same shape. Thus, a manufacturing cost can be reduced.

Note that in the third modification example, the optical member 220 is a member that reflects image light emitted from panel light-emitting units 211 and 212. However, the optical member 220 may include a light guide plate 221 and light sources 222 and 223 as in the first modification example.

7. Fourth Modification Example

Figure 17:
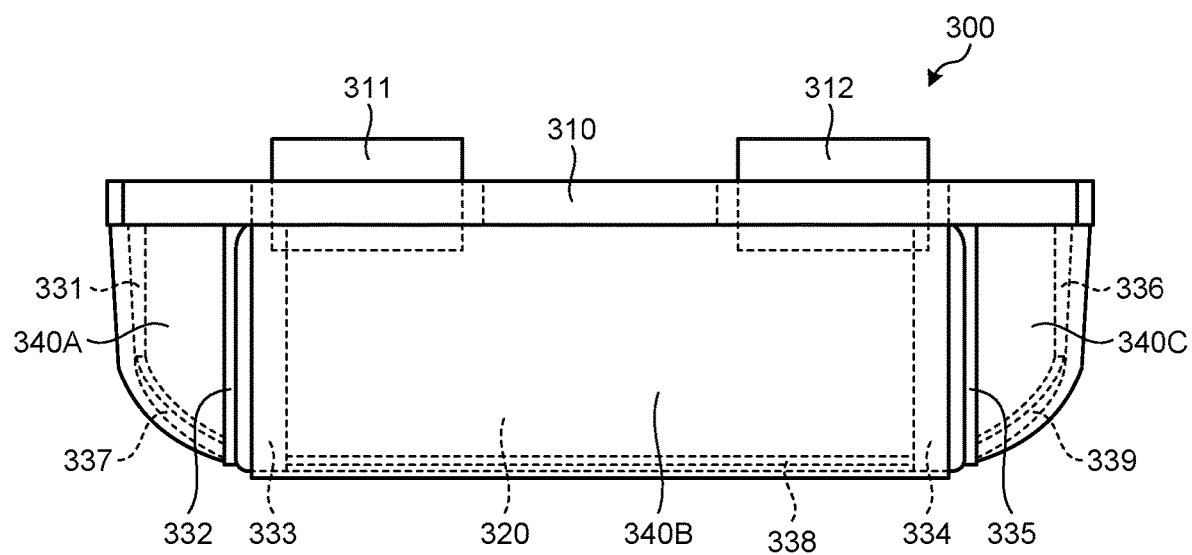
FIG. 17 is a perspective view schematically illustrating a head-mounted display according to a fourth modification example.
Figure 18:
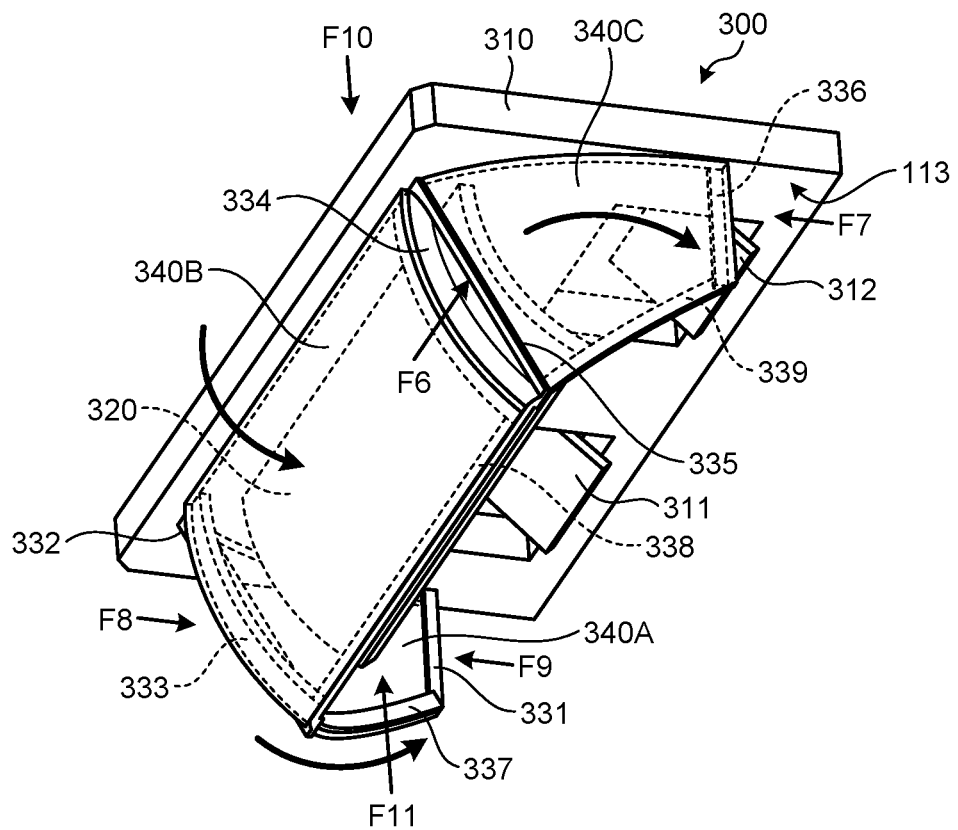
FIG. 18 is a front view schematically illustrating the head-mounted display according to the fourth modification example.
Figure 19:
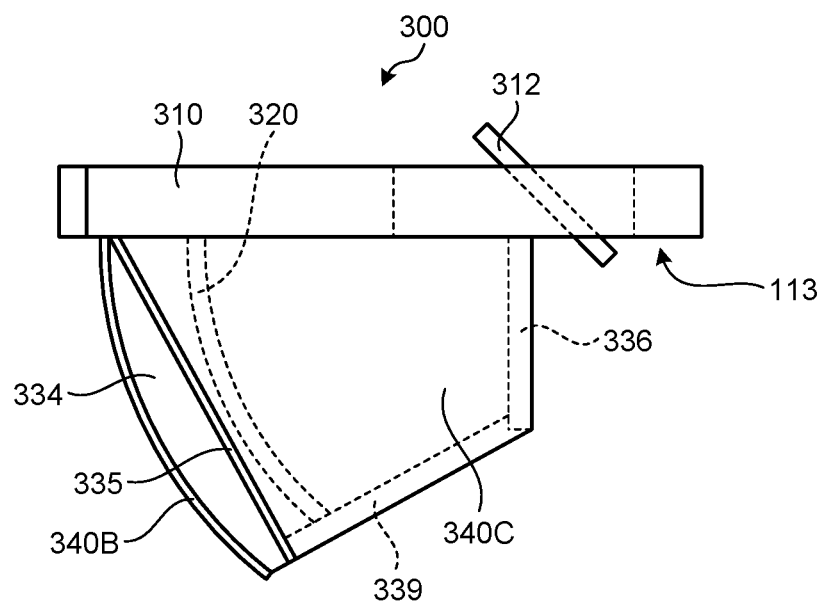
FIG. 19 is a side view schematically illustrating the head-mounted display according to the fourth modification example.

The fourth modification example will be described with reference to FIG. 17 to FIG. 19. FIG. 17 is a perspective view schematically illustrating a head-mounted display 300 according to the fourth modification example. FIG. 18 is a front view schematically illustrating the head-mounted display 300 according to the fourth modification example. FIG. 19 is a side view schematically illustrating the head-mounted display 300 according to the fourth modification example.

In the head-mounted display 300 according to the fourth modification example, three dimming members 340A, 340B, and 340C are arranged. An intermediate member 330 includes reinforcement portions 331, 332, 335, 336, and 338 and extended portions 333, 334, 337, and 339. The intermediate member 330 is extended with a curvature in a predetermined direction. The extended portions 333 and 334 are extended with a curvature in a direction of becoming away from a mounting surface 313. Also, the extended portion 337 is extended from the extended portion 333 with a curvature in a direction of becoming closer to an optical member 320. The extended portion 339 is extended from the extended portion 334 with a curvature in the direction of becoming closer to the optical member 320. Note that the reinforcement portion 332 and the extended portion 333 may be integrally molded as illustrated in FIG. 17 to FIG. 19, or may be separated. Also, the extended portion 334 and the reinforcement portion 335 may be integrally molded as illustrated in FIG. 17 to FIG. 19, or may be separated. Also, the reinforcement portions 331, 332, 335, 336, and 338 and the extended portions 333, 334, 337, and 339 are arranged along an outer periphery of the dimming members 340A, 340B, and 340C.

Each of the dimming members 340A, 340B, and 340C is mounted on the intermediate member 330 in such a manner as to have a curvature in a predetermined direction. The dimming member 340B is mounted on the intermediate member 330 in such a manner as to have a curvature in a direction of becoming away from a front block 310. Here, having a curvature means that a cross section in a direction intersecting with a direction connecting the extended portions 333 and 334 has an arc shape. In other words, having a curvature means that the cross section in the direction intersecting with the direction connecting the extended portions 333 and 334 is curved.

Each of the dimming member 340A and the dimming member 340C is mounted on the intermediate member 330 in such a manner as to have a curvature in a predetermined direction. Here, having a curvature means that a cross section in a direction intersecting with the direction of becoming away from the mounting surface 313 has an arc shape. In other words, having a curvature means that the cross section in the direction intersecting with the direction of becoming away from the mounting surface 313 is curved. Also, each of the dimming member 340A and the dimming member 340C is curved in a convex shape in a direction of becoming away from the optical member 320. The dimming members 340A, 340B, and 340C are arranged via a predetermined gap with respect to the optical member 320.

In the fourth modification example, strength of the head-mounted display 300 can be increased since the reinforcement portions 331, 332, 335, 336, and 338 extended in directions in which the dimming members do not have curvatures are arranged. On the one hand, in the fourth modification example, not all of the reinforcement portions 331, 332, 335, 336, and 338 extended in the directions in which the dimming members do not have the curvatures need to be arranged. For example, the reinforcement portions 331, 336, and 338 may not be arranged. One or both of the reinforcement portion 332 and the reinforcement portion 335 may be deleted. This makes it possible to reduce the number of parts and thus a cost.

In the fourth modification example, terminal portions 343A, 343B, and 343C of the dimming members 340A, 340B, and 340C are arranged at end portions having a flat shape in planar view. For example, since shapes in the planar view are flat when seen in F6 to F11 directions in FIG. 18, the terminal portions 343A, 343B, and 343C are arranged in any of the reinforcement portions 331, 332, 335, 336, and 338, and an upper part of the dimming member 340B. The upper part of the dimming member 340B is one end side arranged on a side of the front block 310. Also, the upper part of the dimming member 340B is an upper end portion of the dimming member 340B of when the head-mounted display 300 is mounted. The terminal portion 343A of the dimming member 340A is arranged at an end portion where the dimming member 340A is mounted on the reinforcement portion 331. Also, for example, the terminal portion 343B of the dimming member 340B is arranged in the upper part of the dimming member 340B. Also, for example, the terminal portion 343C of the dimming member 340C is arranged at an end portion where the dimming member 340C is mounted on the reinforcement portion 336. This makes it possible to prevent the terminal portions 343A, 343B, and 343C from being bent and copper foil from being peeled off, for example. Note that it is possible to hide a wiring line from the outside by performing wiring along a frame from the positions where the terminal portions 343A, 343B, and 343C are arranged to the front block 310 including a substrate. Also, a part of any of the wiring lines 342A, 342B, and 343C of the dimming members 340A, 340B, and 340C may be arranged in an overlapped manner. This makes it possible to secure a large field of view for the observer.

Note that in the fourth modification example, the optical member 320 is a member that reflects image light emitted from panel light-emitting units 311 and 312. However, the optical member 320 may include a light guide plate 321 and light sources 322 and 323 as in the first modification example.

8. Fifth Modification Example

Figure 20A:
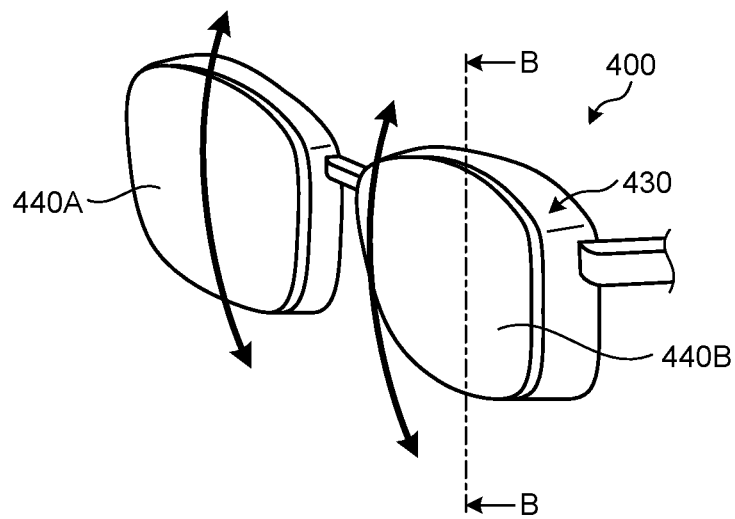
FIG. 20A is a perspective view schematically illustrating glasses according to a fifth modification example.
Figure 20B:
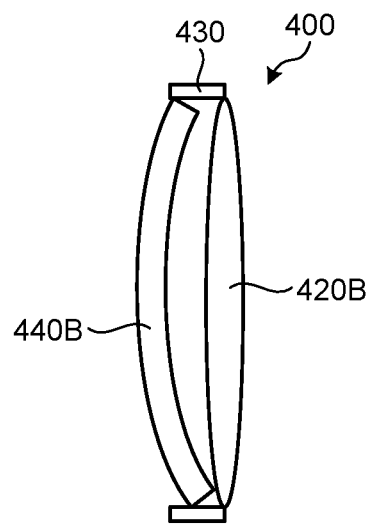
FIG. 20B is a cross-sectional view along a line B-B of FIG. 20A.

The fifth modification example will be described with reference to FIGS. 20A and 20B. In the fifth modification example, a dimming member 440 is mounted on ordinary glasses 400. FIG. 20A is a perspective view schematically illustrating the glasses 400 according to the fifth modification example. FIG. 20B is a cross-sectional view along a line B-B of FIG. 20A. As illustrated in FIG. 20A, the glasses 400 include lenses 420A and 420B as optical members, a frame 430 as an intermediate member, and dimming members 440A and 440B.

As illustrated in FIG. 20A, the lenses 420A and 420B that are the optical members of the glasses 400 are mounted on the frame 430 that is the intermediate member. The dimming members 440A and 440B are mounted on the frame 430 in such a manner as to have a curvature in a predetermined direction. In FIG. 20A, the predetermined direction is a vertical direction of when the glasses 400 are worn. As illustrated in FIG. 20B, the dimming members 440A and 440B are arranged via a predetermined gap with respect to the lenses 420A and 420B. Note that the lenses 420A and 420B may be convex lenses or concave lenses.

Figure 21A:
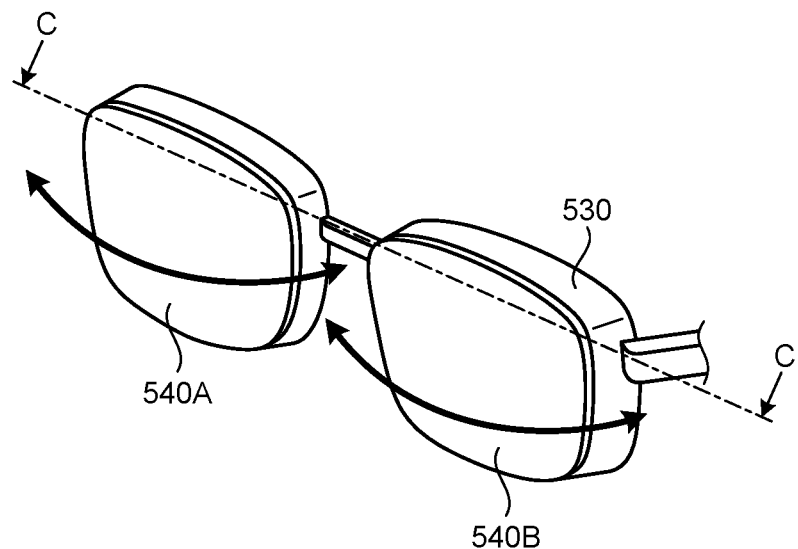
FIG. 21A is a perspective view schematically illustrating the glasses according to the fifth modification example.
Figure 21B:
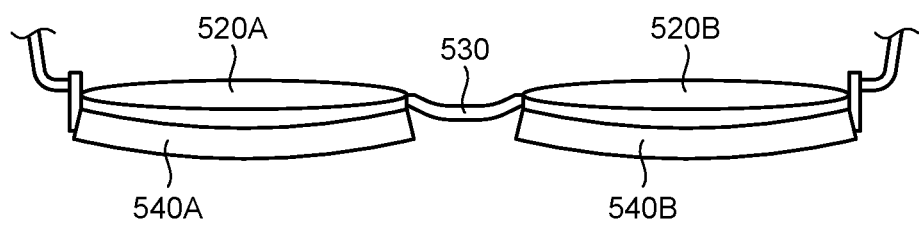
FIG. 21B is a cross-sectional view along a line C-C of FIG. 21A.

Next, another configuration example of glasses will be described. FIG. 21A is a perspective view schematically illustrating glasses 500 according to the fifth modification example. FIG. 21B is a cross-sectional view along a line C-C of FIG. 21A. As illustrated in FIG. 21A, the glasses 500 include lenses 520A and 520B as optical members, a frame 530 as an intermediate member, and dimming members 540A and 540B.

As illustrated in FIG. 21A, the lenses 520A and 520B that are the optical members of the glasses 500 are mounted on the frame 530 that is the intermediate member. The dimming members 540A and 540B are mounted on the frame 530 in such a manner as to have a curvature in a predetermined direction. In FIG. 21A, the predetermined direction is a horizontal direction of when the glasses 400 are worn. As illustrated in FIG. 21B, the dimming members 540A and 540B are arranged via a predetermined gap with respect to the lenses 520A and 520B. The lenses 520A and 520B may be convex lenses or concave lenses.

In the fifth modification example, an example in which the lenses 420A, 420B, 520A, and 520B of the glasses 400 and 500, and the dimming members 440A, 440B, 540A and 540B are mounted on the same frames 430 and 530 has been described. In other words, the optical members (lenses) are mounted on the intermediate member (frame) in the fifth modification example. By giving a predetermined thickness to the frames 430 and 530, it becomes possible to mount the dimming members 440A, 440B, 540A, and 540B having a curvature in a predetermined direction to the frames 430 and 530. It is possible to select the predetermined direction according to a convex amount of the lenses, a degree of inclination of the glasses, and a design. Although glasses are described as an example in the fifth modification example, a configuration in which an intermediate member holds both of an optical member and a dimming element can be also applied to the head-mounted displays 100, 200, and 300.

Also, the glasses 400 and 500 according to the fifth modification example may have optical members such as the panel light-emitting unit and the like described above. In this case, the glasses 400 and 500 respectively have optical members on the frames 430 and 530. Note that the glasses 400 and 500 can be also applied to each of a system of providing an image to an observer by reflecting image light emitted by a panel light-emitting unit as in the example illustrated in FIG. 3, and a system of providing an image to an observer by reflecting light from a light source on a light guide plate and propagating the light as in the example illustrated in FIG. 10.

9. Sixth Modification Example

Figure 22:
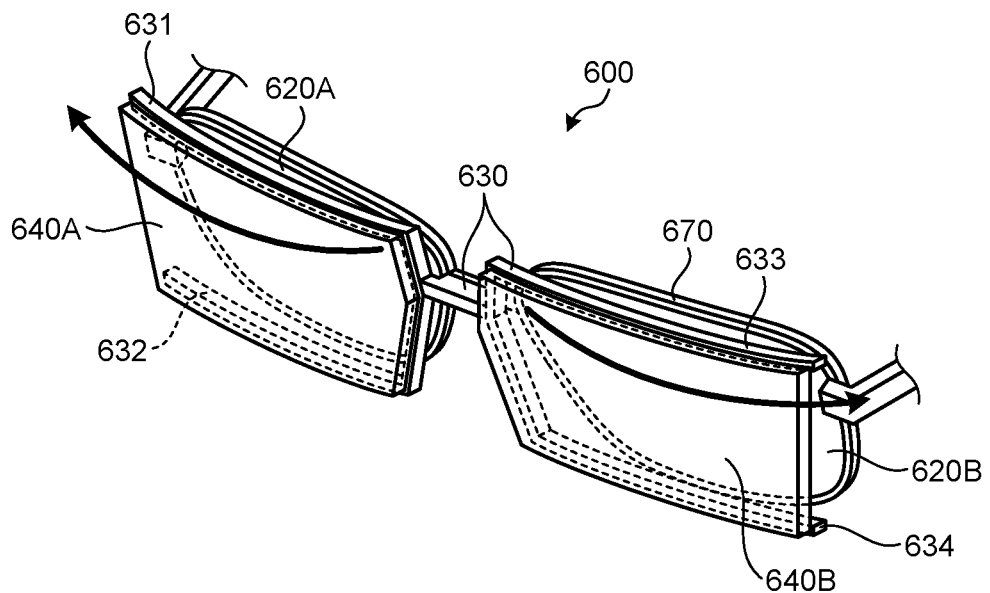
FIG. 22 is a perspective view schematically illustrating glasses according to a sixth modification example.
Figure 23:
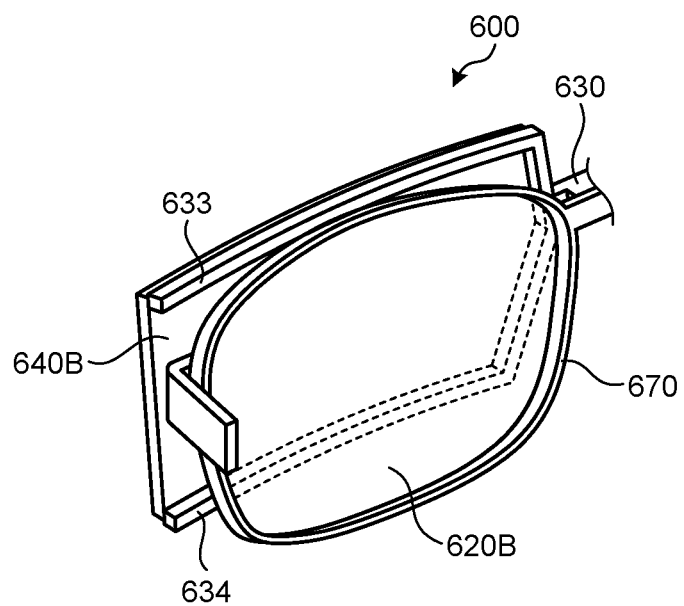
FIG. 23 is a perspective view of FIG. 22 seen from an observer side.

The sixth modification example will be described with reference to FIG. 22 to FIG. 23. FIG. 22 is a perspective view schematically illustrating glasses 600 according to the sixth modification example. FIG. 23 is a perspective view of FIG. 22 seen from an observer side. As illustrated in FIG. 22 and FIG. 23, the glasses 600 include lenses 620A and 620B as optical members, an intermediate member 630, dimming members 640A and 640B, and a frame 670.

The sixth modification example is the same as the fifth modification example in a point that a dimming member 640 is mounted on ordinary glasses. In the sixth modification example, the dimming member 640 is mounted on the intermediate member 630 different from the frame 670 on which the lenses 620A and 640B that are the optical members of the glasses 600 are mounted. Note that the lenses 620A and 620B may be convex lenses or concave lenses.

As illustrated in FIG. 22, the intermediate member 630 has extended portions 631, 632, 633, and 634. Each of the extended portions 631, 632, 633, and 634 are extended with a curvature in a predetermined direction. Each of the dimming members 640A and 640B is mounted on the intermediate member 630 in such a manner as to have a curvature in the predetermined direction. As illustrated in FIG. 22, the lenses 620A and 620B have curvatures in two directions. The dimming members 640 are arranged via a predetermined gap with respect to the lenses 620. Also, a central portion of the frame 670 on which the lenses 620A and 620B are mounted, and a central portion of the intermediate member 630 on which the dimming members 640A and 640B are mounted are connected detachably.

In FIG. 23, a reinforcement portion 635 may be arranged along an outer periphery of the dimming member 640 in such a manner as to connect end portions of the extended portions 631 and 632 which portions are on a side away from the central portion of the glasses 600. Also, a reinforcement portion 636 may be arranged along an outer periphery of the dimming member 640 in such a manner as to connect end portions of the extended portions 633 and 634 which portions are on a side away from the central portion of the glasses 600. This makes it possible to increase strength of the glasses 600. Also, although the glasses are described as an example in the sixth modification example, application to the head-mounted displays 100, 200, and 300 is also possible.

Note that an effect described in the present description is merely an example and is not a limitation, and there may be a different effect. That is, the technology according to the present disclosure can exhibit a different effect obvious to those skilled in the art from a description of the present specification in addition to the above effect or instead of the above effect.

Note that the present technology can also have the following configurations.

(1)

A head-mounted display comprising:
an optical member that provides an image;
an intermediate member extended with a curvature in a predetermined direction; and
a dimming member arranged via a predetermined gap with respect to the optical member and mounted on the intermediate member in the predetermined direction.

(2)

The head-mounted display according to (1), wherein the intermediate member has a plurality of extended portions extended with a curvature in the predetermined direction, and the dimming member is mounted on the plurality of extended portions.

(3)

The head-mounted display according to (1) or (2), wherein both ends of the dimming member are mounted on the plurality of extended portions of the intermediate member.

(4)

The head-mounted display according to (1), wherein the intermediate member is arranged along an outer periphery of the dimming member.

(5)

The head-mounted display according to (1), wherein the dimming member has a larger shape than the optical member.

(6)

The head-mounted display according to (1), wherein the dimming member is arranged on an opposite side of a side to provide the image of the optical member.

(7)

The head-mounted display according to (1), wherein the dimming member is arranged on a center side of the curvature with respect to the intermediate member.

(8)

The head-mounted display according to (1), wherein the intermediate member is made of a material having higher rigidity than that of the dimming member.

(9)

The head-mounted display according to (1), wherein the dimming member is an electrochromic device.

(10)

The head-mounted display according to (1) or (9), wherein the dimming member includes a wiring line.

(11)

The head-mounted display according to any one of (1), (10) to (11), wherein the dimming member has a terminal portion from which the wiring line is pulled out and which is arranged at an end portion of the dimming member which portion has a flat shape in planar view.

(12)

The head-mounted display according to claim any one of (1), (10) to (11), wherein the dimming member includes a first dimming member and a second dimming member, and a part of a first wiring line of the first dimming member and a part of a second wiring line of the second dimming member are arranged in an overlapped manner.

(13)

The head-mounted display according to (1), wherein the optical member is mounted on the intermediate member.

(14)

The head-mounted display according to (1), further comprising a spacer arranged in the predetermined gap.

(15)

Glasses comprising:
an optical member that provides an image;
an intermediate member extended with a curvature in a predetermined direction; and
a dimming member arranged via a predetermined gap with respect to the optical member and mounted on the intermediate member in such a manner as to have a curvature in the predetermined direction.

(16)

The glasses according to (15), wherein the intermediate member and the dimming member are configured detachably.

REFERENCE SIGNS LIST

100 HEAD-MOUNTED DISPLAY
110 FRONT BLOCK
111, 112 PANEL LIGHT-EMITTING UNIT
113 MOUNTING SURFACE
120 OPTICAL MEMBER
130 INTERMEDIATE MEMBER
131, 132, 133 EXTENDED PORTION
134 REINFORCEMENT PORTION
140 DIMMING MEMBER
141 DIMMING UNIT
142 WIRING LINE
143 TERMINAL PORTION
150 SPACER
160 DIMMING UNIT
170 MOUNTING PORTION

The invention claimed is:

1. A head-mounted display comprising:
an optical member that provides an image;
an intermediate member extended with a curvature in a predetermined direction; and
a dimming member arranged via a predetermined gap with respect to the optical member and mounted on the intermediate member in the predetermined direction.

2. The head-mounted display according to claim 1, wherein the intermediate member has a plurality of extended portions extended with a curvature in the predetermined direction, and the dimming member is mounted on the plurality of extended portions.

3. The head-mounted display according to claim 2, wherein both ends of the dimming member are mounted on the plurality of extended portions of the intermediate member.

4. The head-mounted display according to claim 1, wherein the intermediate member is arranged along an outer periphery of the dimming member.

5. The head-mounted display according to claim 1, wherein the dimming member has a larger shape than the optical member.

6. The head-mounted display according to claim 1, wherein the dimming member is arranged on an opposite side of a side to provide the image of the optical member.

7. The head-mounted display according to claim 1, wherein the dimming member is arranged on a center side of the curvature with respect to the intermediate member.

8. The head-mounted display according to claim 1, wherein the intermediate member is made of a material having higher rigidity than that of the dimming member.

9. The head-mounted display according to claim 1, wherein the dimming member is an electrochromic device.

10. The head-mounted display according to claim 9, wherein the dimming member includes a wiring line.

11. The head-mounted display according to claim 10, wherein the dimming member has a terminal portion from which the wiring line is pulled out and which is arranged at an end portion of the dimming member which portion has a flat shape in planar view.

12. The head-mounted display according to claim 10, wherein the dimming member includes a first dimming member and a second dimming member, and a part of a first wiring line of the first dimming member and a part of a second wiring line of the second dimming member are arranged in an overlapped manner.

13. The head-mounted display according to claim 1, wherein the optical member is mounted on the intermediate member.

14. The head-mounted display according to claim 1, further comprising a spacer arranged in the predetermined gap.

15. Glasses comprising:

an optical member that provides an image;

an intermediate member extended with a curvature in a predetermined direction; and a dimming member arranged via a predetermined gap with respect to the optical member and mounted on the intermediate member in such a manner as to have a curvature in the predetermined direction.

16. The glasses according to claim 15, wherein the intermediate member and the dimming member are configured detachably.

\* \* \* \* \*